(12) United States Patent
Nakamura (10) Patent No.: US 11,831,968 B2
(45) Date of Patent: Nov. 28, 2023

(54) IMAGE PICKUP APPARATUS COMPRISING FIRST AND SECOND SENSOR UNITS EACH INCLUDING A PLURALITY OF SENSORS

(71) Applicant: CANON KABUSHIKI KAISHA, Tokyo (JP)

(72) Inventor: Tsubasa Nakamura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/385,645

(22) Filed: Jul. 26, 2021

(65) Prior Publication Data
US 2022/0046149 A1 Feb. 10, 2022

(30) Foreign Application Priority Data

Aug. 4, 2020 (JP) .................................. 2020-132120

(51) Int. Cl.
| | | |
|---|---|---|
| H04N 23/54 | (2023.01) | |
| G03B 17/14 | (2021.01) | |
| H04N 23/55 | (2023.01) | |
| H04N 25/76 | (2023.01) | |
| H04N 25/531 | (2023.01) | |

(52) U.S. Cl.
CPC ............. *H04N 23/54* (2023.01); *G03B 17/14* (2013.01); *H04N 23/55* (2023.01); *H04N 25/531* (2023.01); *H04N 25/76* (2023.01)

(58) Field of Classification Search
CPC .. H04N 5/2253; H04N 5/2254; H04N 5/3532; H04N 5/374; H04N 5/349; H04N 5/3535; H04N 5/3537; H04N 9/0455; H04N 9/04559; H04N 5/351; G03B 17/14; G03B 7/00; G03B 33/00
See application file for complete search history.

(56) References Cited

U.S. PATENT DOCUMENTS

| | | | |
|---|---|---|---|
| 11,252,345 B2 * | 2/2022 | Sun ........................ | H04N 5/332 |
| 2011/0122308 A1 * | 5/2011 | Duparre ............ | H01L 27/14621 |
| | | | 348/340 |
| 2012/0176521 A1 * | 7/2012 | Compton ............. | H04N 23/843 |
| | | | 348/266 |
| 2016/0344965 A1 * | 11/2016 | Grauer .............. | H01L 27/14656 |

(Continued)

FOREIGN PATENT DOCUMENTS

| | | |
|---|---|---|
| JP | 2015-226299 A | 12/2015 |
| JP | 6123213 B2 | 5/2017 |

(Continued)

*Primary Examiner* — Padma Haliyur
(74) *Attorney, Agent, or Firm* — CANON U.S.A., INC. IP Division (57) ABSTRACT

An apparatus includes a first sensor unit that includes a plurality of first sensors arranged in the first direction which include a first sensor configured to receive a first image formed by light with a first wavelength, a second sensor unit that includes a plurality of second sensors arranged in the first direction which include a second sensor configured to receive a second image formed by light with a second wavelength, and a controller configured to control the first and second sensor units. The controller controls the plurality of first sensors under a first common exposure condition, and controls the plurality of second sensors in the second sensor unit under a second common exposure condition.

19 Claims, 4 Drawing Sheets

(56) References Cited

U.S. PATENT DOCUMENTS

| | | | | |
|---|---|---|---|---|
| 2017/0016768 A1* | 1/2017 | Golub | ............... | H04N 25/134 |
| 2018/0255252 A1* | 9/2018 | Lewkow | ............. | G02B 27/141 |
| 2018/0266941 A1* | 9/2018 | Sano | ................. | G01N 21/35 |
| 2018/0309919 A1* | 10/2018 | Naing | ............... | H04N 5/3765 |
| 2021/0044763 A1* | 2/2021 | Sun | ................. | H04N 5/2353 |
| 2022/0038613 A1* | 2/2022 | Kobayashi | ......... | A61B 1/00188 |

FOREIGN PATENT DOCUMENTS

| | | | | |
|---|---|---|---|---|
| JP | 2018-117375 A | 7/2018 | | |
| JP | 2019-15565 A | 1/2019 | | |
| WO | WO-2019153787 A1 * | 8/2019 | ........... | H04N 5/2251 |

* cited by examiner

FIG. 4B

IMAGE PICKUP APPARATUS COMPRISING FIRST AND SECOND SENSOR UNITS EACH INCLUDING A PLURALITY OF SENSORS

BACKGROUND OF THE DISCLOSURE

Field of the Disclosure

The aspect of the embodiments relates to an image pickup apparatus.

Description of the Related Art

There have recently been proposed a method for analyzing a composition of an object and a method for identifying an object that is difficult for humans to see with high accuracy, each of which uses a camera that can acquire band information in visible and invisible ranges in addition to three-band (wavelength band) information of RGB that is suitable for the visual characteristics of humans. In the following description, a spectral image containing four or more band information will be referred to as a "multi-band image" so as to distinguish it from the conventional RGB image.

A silicon sensor generally used as an image sensor has a characteristic in that its sensitivity to light with a wavelength decreases as the wavelength separates from the designed center wavelength. Thus, when a plurality of images formed from light with different wavelengths are simultaneously captured by a single image sensor, the intensity of the acquired signal distributes and a dynamic range of the acquired signal corresponding to light with a wavelength on the low sensitivity side becomes narrow.

Japanese Patent No. ("JP") 6123213 discloses a camera configured to balance the intensity of the acquired signal by adjusting a transmittance of a bandpass filter.

The camera disclosed in JP 6123213 decreases the transmittance of the bandpass filter corresponding to the light in the visible range to which the image sensor is highly sensitive, weakens the intensity of the incident light, and thus finally reduces the utilization efficiency of the incident light.

SUMMARY OF THE DISCLOSURE

An apparatus includes a first sensor unit that includes a plurality of first sensors arranged in a first direction, a second sensor unit that includes a plurality of second sensors arranged in the first direction, and a controller configured to control the first and second sensor units. The first sensor unit includes a first sensor configured to receive a first image formed by light with a first wavelength. The second sensor unit includes a second sensor configured to receive a second image formed by light with a second wavelength. The controller controls the plurality of first sensors under a first common exposure condition, and controls the plurality of second sensors under a second common exposure condition.

Further features of the disclosure will become apparent from the following description of exemplary embodiments with reference to the attached drawings.

DESCRIPTION OF THE EMBODIMENTS

Referring now to the accompanying drawings, a description will be given of embodiments according to the disclosure. Corresponding elements in respective figures will be designated by the same reference numerals, and a duplicate description thereof will be omitted.

First Embodiment

Figure 1A:
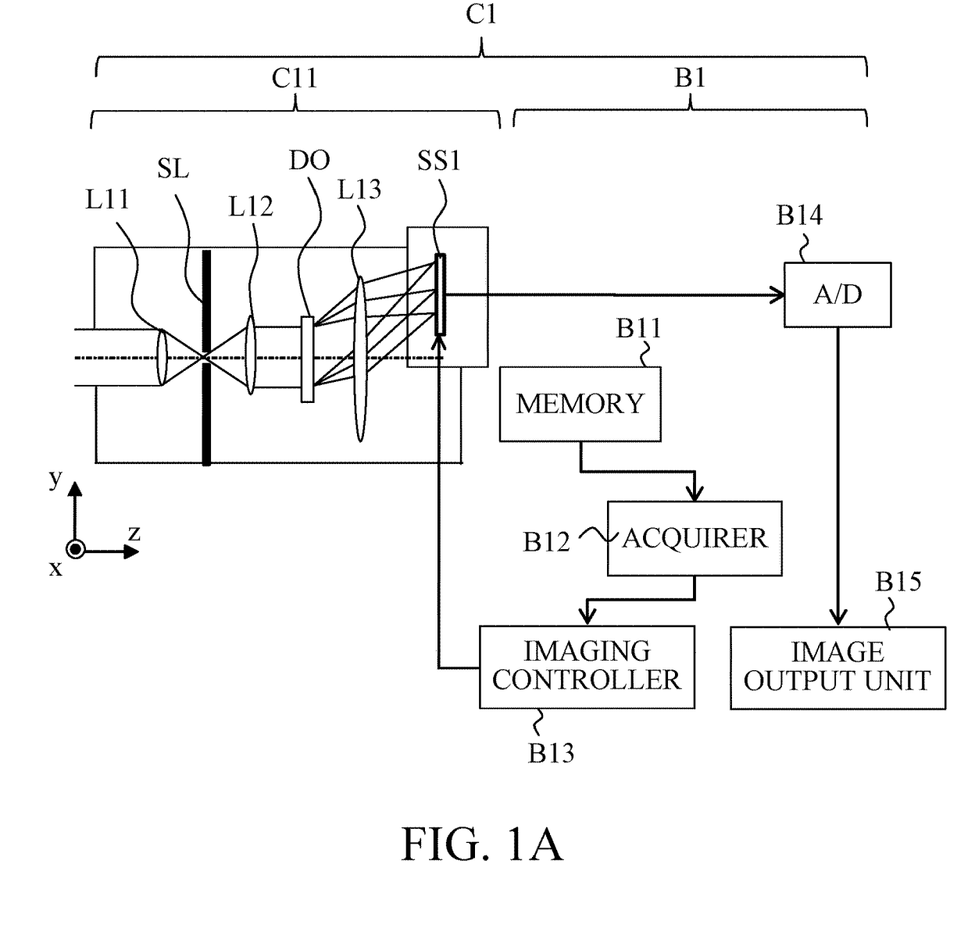
FIGS. 1A and 1B explain an image pickup apparatus according to a first embodiment.
Figure 1B:
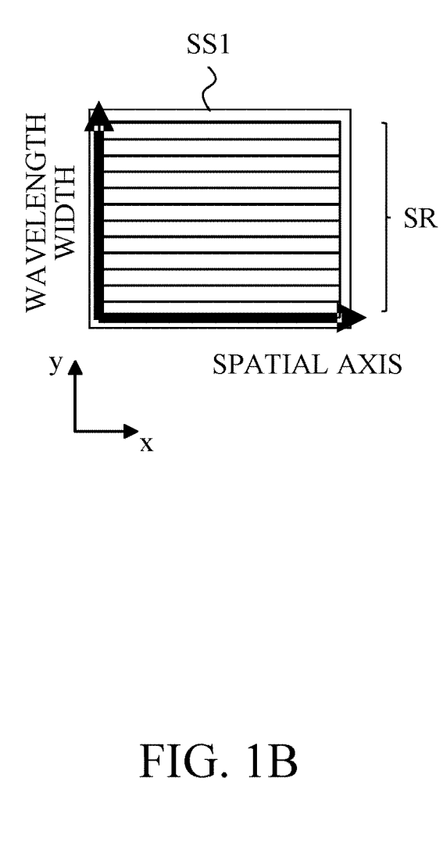

FIGS. 1A and 1B explain an image pickup apparatus C1 according to this embodiment. As illustrated in FIG. 1A, the image pickup apparatus C1 includes an imaging unit C11 and a control system B1.

The imaging unit C11 has a spectral optical system and an image sensor (imager) SS1. The spectral optical system includes a lens L11, a slit SL, a lens L12, a diffraction (optical) element (or diffraction optics) DO, and a lens L13. The image sensor SS1 includes a first image sensor unit that includes a first image sensor that receives a first spectral image having a first optical characteristic formed by the spectral optical system. The image sensor SS1 further includes a second image sensor unit that includes a second image sensor that receives a second spectral image having a second optical characteristic formed by the spectral optical system. As will be described later, the first and second image sensor units perform imaging under different exposure conditions. More specifically, the first image sensor unit performs imaging under a first exposure condition, and the second image sensor unit performs imaging under a second exposure condition. The exposure in the disclosure may refer to control parameters, such as an exposure time and an ISO speed, which increase or decrease the luminance value acquired by the image sensor. The spectral optical system may be attachable to and detachable from the image pickup apparatus C1.

The imaging unit C11 according to this embodiment is a pushbroom type image pickup system. The image sensor SS1 can control a plurality of two-dimensionally arranged image sensors for at least one row under a common exposure condition.

The lens L11 images a light beam from the object (not shown) on the slit SL. The slit SL cuts out the spatial information of the object as a substantially one-dimensional image. Assuming reimaging by the optical system in the subsequent stage, this embodiment adjusts the slit shape into a short side length of 1 pixel of the image sensor and a long side length of a width of the image sensor SS1 (in the x-axis direction in FIGS. 1A and 1B). The lens L12 returns the one-dimensional image cut out by the slit SL to a parallel light beam and introduces it to the diffraction element DO. Since the light beam passing through the diffraction element DO has a different diffraction angle for each wavelength, the diffraction element DO serves as a spectral optical element that performs spectroscopy in the angular direction. The dispersed parallel light beam is condensed on the image sensor SS1 by the lens L13 and reimaged. The spectral image formed on the image sensor SS1 has orthogonally developed spatial information of the object in the x-axis direction and wavelength information of the object in the y-axis direction (see FIG. 1B). FIG. 1B illustrates, as spectral ranges SR, compartments in which a one-dimensional spectral image (spatial information) for each wavelength on the image sensor SS1 is captured. The number of spectral ranges SR may be smaller or larger than that illustrated in FIG. 1B. As described above, the imaging unit C11 can provide a spectral image of a one-dimensional object image at a certain moment. Scanning the object and the image pickup apparatus C1 relative to each other in the y-axis direction can also provide a two-dimensional spectral image of the object.

Figure 2:
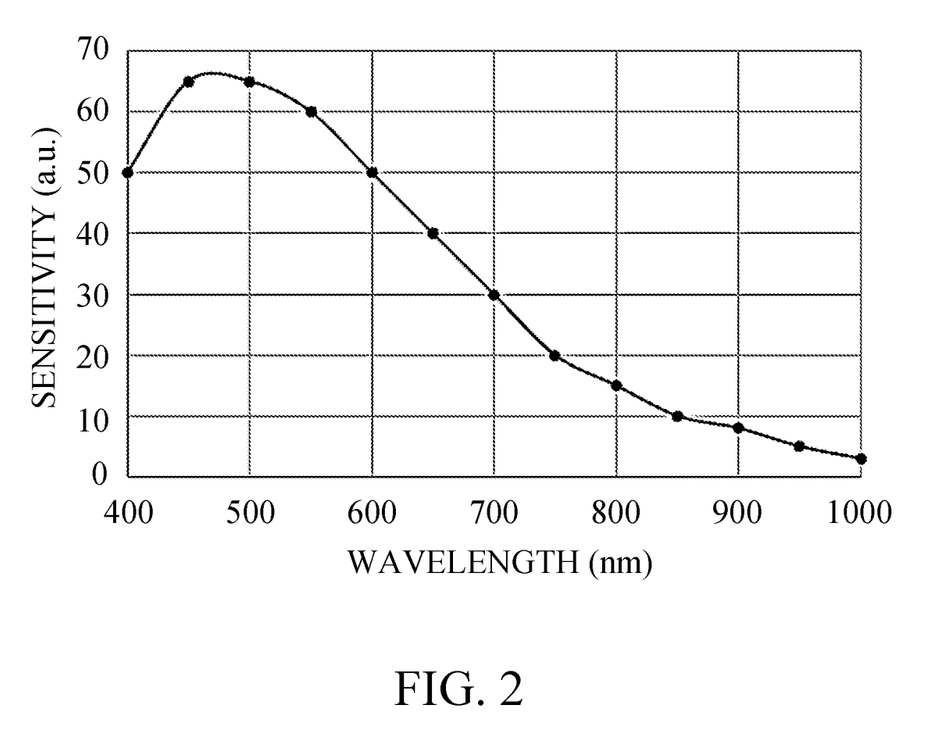
FIG. 2 illustrates the wavelength sensitivity of a general image sensor.

FIG. 2 illustrates a wavelength sensitivity of a general image sensor (such as a silicon sensor) used in a camera. As illustrated in FIG. 2, the general image sensor has a characteristic in that its sensitivity to light at the central wavelength (around 500 nm) in the visible range is maximum, and the sensitivity to light at a wavelength lowers as the wavelength separates from the peak wavelength. For example, light with a wavelength of 500 nm and light with a wavelength of 900 nm differ in sensitivity by 6 times or more. When a spectral image is captured under a certain exposure condition using an image pickup apparatus that includes an image sensor having the characteristic illustrated in FIG. 2, a spectral image corresponding to light with a wavelength of 900 nm is six times darker than a spectral image corresponding to light with a wavelength of 500 nm.

Now assume that the image sensor having the characteristics illustrated in FIG. 2 is incorporated as the image sensor SS1 into the image pickup apparatus C1 according to this embodiment and an object having a near-infrared wavelength (near 900 nm) is imaged which causes a small reflected light amount. When the exposure is set so as to make as bright as possible the spectral image corresponding to the light with the wavelength of 900 nm, a luminance value may be saturated in the spectral image corresponding to the light with the wavelength of 500 nm. Since the intensity distribution (that is, intensity ratio) of the acquired signal for each wavelength is important for the spectral analysis, the saturated luminance value in the spectral image causes an analytical error and improper data transaction. Since the spectral image pickup apparatus as in this embodiment can control the exposure in a range having no luminance saturation, the S/N ratio deteriorates in the dark area in the spectral image, particularly in the near-ultraviolet range and the near-infrared range. It is possible to adjust the peak wavelength in the design of the image sensor, but since the wavelength sensitivity also shows a mountain curve shape, the same issue occurs in an attempt to obtain multiple spectral images corresponding to light of a wide wavelength range at the same time.

This embodiment devises the control system B1. The control system B1 includes a memory B11, an acquirer (acquisition unit) B12, an imaging controller (imaging control unit) B13, an A/D converter B14, and an image output unit B15.

The memory B11 stores information on the wavelength sensitivity characteristic of the image sensor SS1 and position information of the spectral range SR on the image sensor SS1, and outputs each information to the acquirer B12. The information stored in the memory B11 may be stored in a device different from the image pickup apparatus C1.

The acquirer B12 acquires an exposure condition that balances the acquired luminance value for each spectral range SR, using the information from the memory B11. In this embodiment, the acquirer B12 acquires as the exposure condition a coefficient obtained by inverting the graph of FIG. 2 upside down in order to simply cancel the sensitivity characteristic of the image sensor SS1 against the wavelength. Thereby, when the light from the object is white light having a constant intensity in the acquired wavelength range, the luminance value of the spectral image has a constant value. In this embodiment, since the spectral range SR horizontally extends on the image sensor SS1 as illustrated in FIG. 1B, the same wavelength information is arranged along the spatial axis direction (x-axis direction) in the spectral range SR. Thus, it is unnecessary to change the exposure condition along the spatial axis direction, and the circuit scale can be made relatively small. In this embodiment, the acquirer B12 acquires the exposure condition, but a device different from the image pickup apparatus C1 may acquire the exposure condition. The acquirer B12 may acquire as exposure condition the exposure time, ISO speed, and the like according to the wavelength sensitivity characteristic of the image sensor SS1.

The imaging controller B13 controls the image sensor SS1 using the exposure condition for each spectral range SR in the image sensor SS1 acquired from the acquirer B12. The image sensor SS1 is controlled by the imaging controller B13, and outputs as an electric signal an image on the imaging plane.

The A/D converter B14 converts the output signal from the image sensor SS1, which is an analog signal, into a digital signal.

The image output unit B15 outputs a spectral image dispersed in the wavelength axis direction (Y-axis direction) of the image sensor SS1 using the signal output from the A/D converter B14.

The image sensor C11 according to this embodiment is a pushbroom type image pickup system and can acquire two-dimensional spatial information by scanning the object in the Y-axis direction. A multi-band image can be formed by bundling line spectral images output from the image output unit B15 using an external computer (not shown). This embodiment digitizes the image information in the image pickup apparatus C1, but may output the image as the analog information.

As described above, combining the spectral optical system with a function of controlling (part of) the exposure in the image sensor SS1 can eliminate a need of dimming with an optical filter, and efficiently utilize the incident light. When the exposure is controlled by the exposure time, the predefined luminance value can be immediately obtained in the spectral range SR having a large wavelength sensitivity (short exposure time), and the data transfer can be started. As a consequence, when the exposure in a certain spectral range SR is completed, data of the next spectral range SR can be immediately acquired (scanned), so that the spectral image for one surface can be quickly acquired. A continuous spectral image, particularly a multi-band image can be also quickly acquired by a pushbroom type imaging system. The spectral range SR in the image sensor SS1 does not necessarily have to have adjacent areas, but may be developed for convenience of wiring on the circuit. The configuration can be made simpler by sequentially scanning adjacent pixels or rows of pixels.

A supplemental description will now be given of an advantage of combining the aspect of the embodiments with a pushbroom type imaging system. A description will now be given of a combination of the disclosure with a sensor (referred to as a "mosaic type sensor" hereinafter) in which spectral filters are dispersed in a mosaic shape on the image sensor. In the mosaic type sensor, the spectral range that provides spectral images that should receive the same exposure condition are discretely distributed over the entire image sensor surface, so an exposure control mechanism is provided for each pixel on the image sensor. Therefore, the wiring becomes complicated, and the circuit density is increased, so that the manufacturing becomes difficult or the aperture ratio of the photoelectric conversion element decreases.

The effect of the disclosure can be economically implemented by combining the spectral optical system having a spectral range that is integrated to some extent with an image sensor as in this embodiment. For example, it is effective for the pushbroom type imaging system to use a rolling shutter type CMOS sensor as the imaging sensor SS1. By aligning the line direction corresponding to the scan of one line of the CMOS sensor with the longitudinal direction (spatial axis direction) of the spectral range SR, the spectral range SR and the line to be scanned coincide with each other and thus the exposure control may be made for each line to be scanned. In other words, the exposure control mechanism on the CMOS sensor side may be connected to the circuit block for each line at the same time, and the circuit scale can be made smaller than that of the mosaic type sensor.

As described above, the configuration according to this embodiment can restrain the intensity of incident light from lowering and balance the acquired signal for each wavelength.

This embodiment has shown an example that makes constant the exposure condition in the spatial axis direction on the image sensor SS1. However, depending on the configurations of the spectral optical system and the image sensor, the luminance may decrease outside the angle of view (vignetting, shading, defects in the image sensor, etc.), and thus the in-plane luminance uniformity may be adjusted by combining the controls for correcting them. For example, the memory B11 stores information on the luminance distribution and the luminance unevenness in the image sensor SS1 derived from the image pickup apparatus C1. When the acquirer B12 considers this information and outputs to the imaging controller B13 an exposure condition that makes the acquired image uniform over the entire surface, the user can always obtain a uniform image without worrying about the luminance distribution and luminance unevenness derived from the image pickup apparatus C1.

In this embodiment, when the exposure condition is controlled by the exposure time, scanning is shifted to the next spectral range when the exposure time reaches a predefined amount in a certain spectral range. In another example, when the exposure time reaches a predefined amount in a certain spectral range, scanning in the same spectral range may be restarted. That is, the image may be updated asynchronously for each spectral range. In this case, a signal relating to a spectral image corresponding to a spectral range is output without waiting for the exposure of another spectral range at a timing when the exposure time ends. This method can generate continuous multi-band motion images having different frame rates for each spectral range. A spectral image having a wavelength to which the image sensor has low sensitivity does not have sufficient luminance unless the exposure time is extended, and results in a low-speed motion image. However, use of a spectral image having a wavelength that provides the high sensitivity can generate an intermediate frame through an image combination, and upsampling in the time direction. The above control may be performed at a timing when the exposure amount reaches the predefined amount instead of the exposure time.

In this embodiment, the spectral optical system and the image sensor SS1 are disposed so that the y-axis (diffraction direction axis) which is the spectral direction of the imaging unit C11 and one line corresponding to one scan of the image sensor SS1 (one line of the image sensor SS1) are orthogonal to each other, but the disclosure is not limited to this embodiment. As long as the y-axis, which is the spectral direction of the imaging unit C11, is not parallel to one line corresponding to one scan of the image sensor SS1, the x-axis having the spatial information may not be completely parallel to one line. Since the axes of the spectral information (y) and the spatial information (x) are slightly tilted (not orthogonal) to the orthogonal matrix of the image sensor SS1, information corresponding to the subpixel can be obtained from the adjacent pixels and the interpolation may provide information higher than the resolution of the image sensor SS1. Using this principle, the positional relationship between the spectral direction and the line direction of the image sensor SS1 may be shifted. Since spectral information located at four corners of the image sensor SS1 is lost as a position separates from the orthogonal relationship illustrated in this embodiment, a protrusion amount in the y-axis direction due to the inclination of the spectral range SR may fall within a range of about ±1 to 3 pixels.

Second Embodiment

Figure 3A:
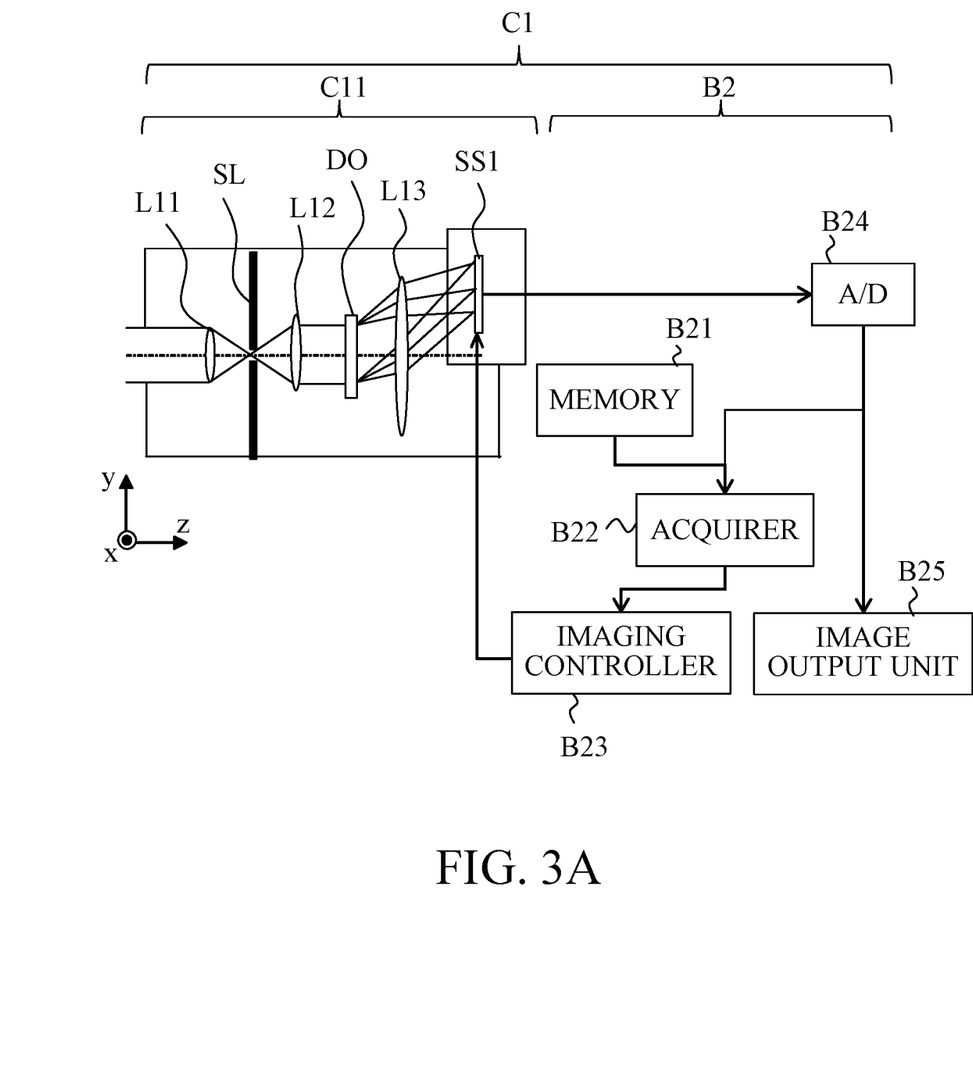
FIGS. 3A and 3B explain an image pickup apparatus according to a second embodiment.
Figure 3B:
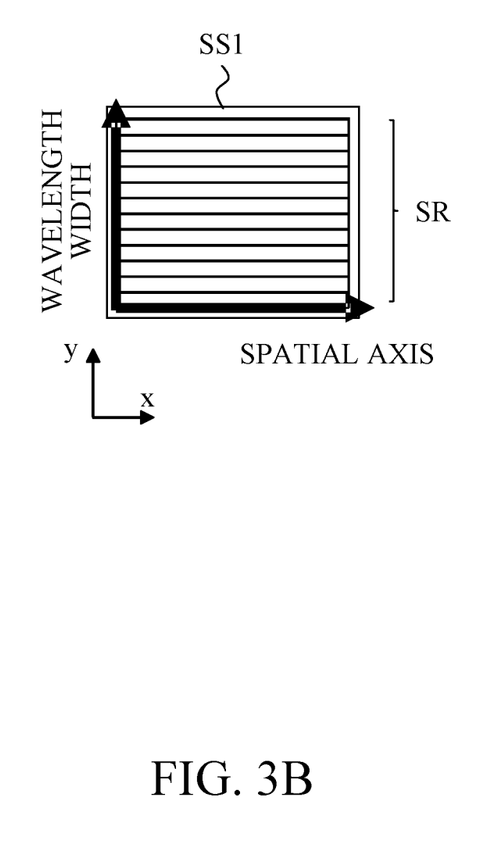

FIGS. 3A and 3B explain an image pickup apparatus C1 according to this embodiment. In this embodiment, only a difference from the first embodiment will be discussed, and a description of the same configuration will be omitted.

As illustrated in FIG. 3A, the image pickup apparatus C1 includes an imaging unit C11 and a control system B2. The control system B2 includes a memory B21, an acquirer B22, an imaging controller B23, an A/D converter B24, and an image output unit B25.

The acquirer B22 acquires the exposure condition using information of the wavelength sensitivity characteristic of the image sensor SS1 from the memory B21 and information of the current acquired image from the image sensor SS1 and the A/D converter B24. The luminance value for each wavelength fluctuates for each area in the object depending on the ambient light and the spectral reflectance of the object. This embodiment acquires the exposure condition such that the luminance value becomes a proper value that is not saturated in the image sensor SS1 and is not too dark, and updates the exposure condition for the next imaging. This configuration can capture an image following the luminance of a dynamically fluctuating object. In particular, in imaging with the image pickup apparatus C1 according to this embodiment, narrow peaks and bottoms (spectral lines of constituent atoms, absorption lines, etc.) may occur at a specific wavelength depending on the working illumination. Since the luminance of the spectral image may extremely fluctuate, the configuration of this embodiment can avoid the luminance saturation while maintaining the S/N ratio.

Given the wavelength intensity distribution (spectral characteristics) of the ambient light during imaging, the reflection characteristic for each wavelength of the object can be recalculated from the multi-band image. Therefore, the control system B1 may include an estimator configured to estimate the wavelength intensity distribution of the ambient light from the information of the current acquired image (intensity ratio between the first and second spectral images). For example, the wavelength intensity distribution of the ambient light may be estimated from the wavelength intensity balance of the entire acquired image using the principle of auto white balance. The wavelength intensity distribution on the surface having the reflection characteristic that is substantially uniform against the wavelength in the object may be substituted as the wavelength intensity distribution of the ambient light. In an experimental system projects light from a known light source as ambient light, the wavelength intensity distribution of the light source may be directly input. When the type of ambient light is known and the number is limited, each wavelength intensity distribution may be stored in the memory B21. Instead of providing the estimator, the acquirer B22 may be configured to estimate the wavelength intensity distribution of the ambient light.

The spectral range SR may include an exposure evaluating area (not shown) provided with a device dedicated for the exposure evaluation. This area can provide a proper exposure condition with high accuracy.

As described above, in addition to the effect of the first embodiment, the configuration according to this embodiment can capture an image following the dynamically fluctuating luminance of the object for each wavelength.

Third Embodiment

Figure 4A:
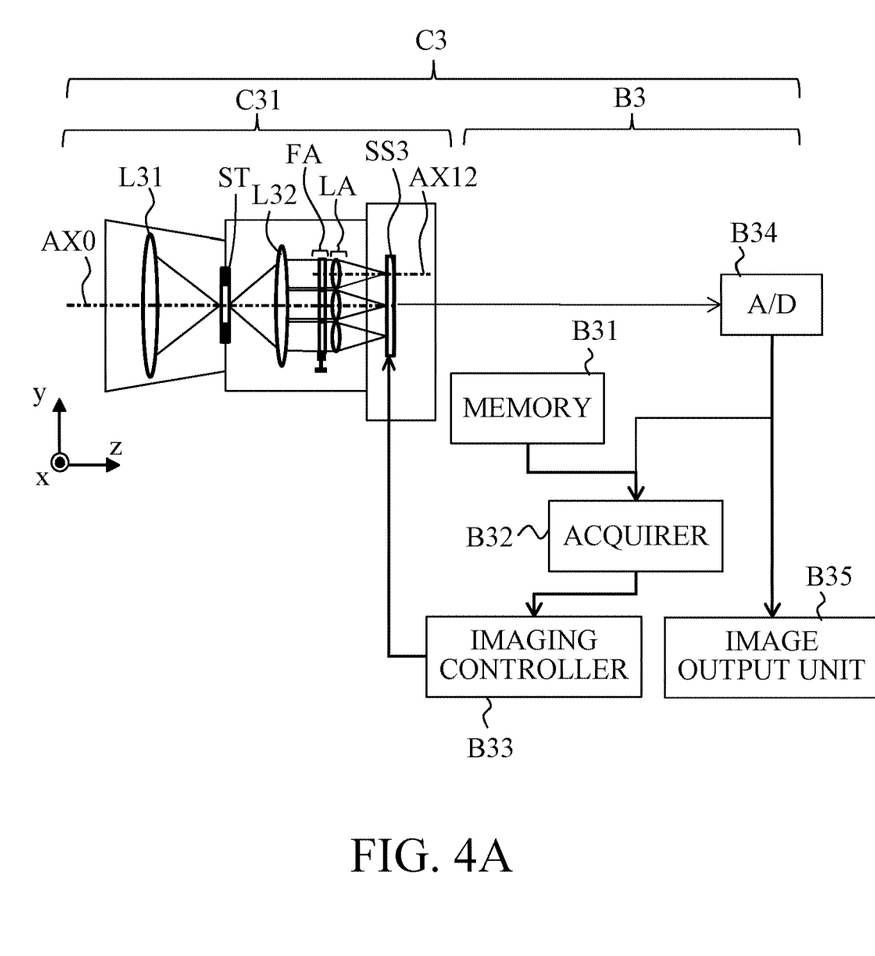
FIGS. 4A and 4B explain an image pickup apparatus according to a third embodiment.
Figure 4B:
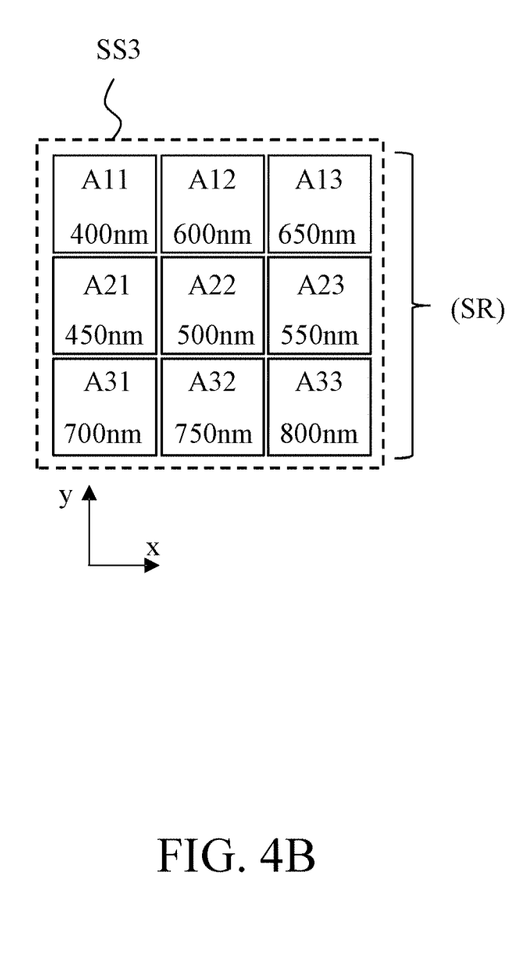

The first and second embodiments use a pushbroom type imaging system, but this embodiment uses another imaging system. FIGS. 4A and 4B explain an image pickup apparatus C3 according to this embodiment. In this embodiment, only a difference from the first embodiment will be discussed, and a description of the same configuration will be omitted.

As illustrated in FIG. 4A, the image pickup apparatus C3 includes an imaging unit C31 and a control system B3. The imaging unit C31 includes a spectral optical system and an image sensor SS3. The image sensor SS3 has a first image sensor that receives a first spectral image having a first optical characteristic formed by the spectral optical system, and a second image sensor that receives a second spectral image having a second optical characteristic formed by the spectral optical system. As will be described later, the first and second image sensors perform imaging under different exposure conditions.

The imaging unit C31 includes, in order from the object side (left side in FIG. 4A) to the image side, an objective lens L31, a field diaphragm ST, a collimator lens L32, a filter array (spectral filter array) FA, a lens array LA, and an imaging sensor SS3. The filter array FA includes a group of spectral filters having different spectral transmittance characteristics. The lens array LA includes a group of small-diameter lenses (imaging elements). This configuration can duplicate the intermediate image of the object on the field diaphragm ST imaged by the objective lens L31, on the image sensor SS3 through the individual small-diameter lenses of the lens array LA, and form an array of images. Since the spectral filters having different spectral transmittance characteristics are disposed (the filter array is formed) on the optical paths of the small-diameter lenses, the spectral images can be simultaneously obtained on the image sensor SS3.

FIG. 4B illustrates a schematic view of the filter array FA viewed from the object side. In FIG. 4B, a 3×3, i.e., totally 9-band filter array is formed. In FIG. 4B, A11 to A33 show spectral ranges corresponding to the spectral filters in the filter array FA. "xxxnm" indicates a center value of the transmission wavelength for each spectral filter. This embodiment uses a bandpass filter with a narrow band centered on the transmission wavelength as the spectral filter, but the combination of the spectral transmittance distributions of the spectral filters is arbitrary. For example, an image formed through a spectral filter having a wide band and discrete spectral transmittance distribution can be regarded as a "spectral image (array)" in a broad sense as long as the spectral transmittance distribution differs in the filter array.

A small-diameter lens corresponding to each spectral filter in the filter array FA is disposed between the filter array FA and the image sensor SS3. Thus, a spectral image is formed for each of the spectral ranges A11 to A33 on the surface of the image sensor SS3. That is, the image pickup apparatus C3 according to this embodiment is a 9-band multi-band camera. The division of the array in this embodiment is merely illustrative, and the number of divisions may be increased, such as 5×5, or the array may have a different aspect ratio, such as 4×3. The spectral optical system according to this embodiment is configured so that the filter array is interchangeable. Thus, the image pickup apparatus C3 can easily acquire various multi-band images.

The field diaphragm ST is disposed at a position where the focal position of the objective lens L31 and the focal position of the collimator lens L32 overlap each other. The field diaphragm ST disposed in this way can introduce a collimated light beam to the filter array FA and the lens array LA at each angle of view. When the spectral filter is an interference type optical filter, it is generally known that the transmission wavelength depends on an angle and the center value of the transmission wavelength is more likely to fluctuate as the wavelength becomes longer. On the other hand, the configuration according to this embodiment introduces parallel light beams to the filter array FA at substantially the same angle for each angle of view, and can minimize the issue of angle dependency of the transmitted wavelength.

The objective lens L31, the collimator lens L32, and the central lens of the lens array LA share an optical axis AX0, but the peripheral small-diameter lenses in the lens array LA shift from the optical axis AX0. An optical axis AX12 is described as a representative optical axis of the peripheral small-diameter lenses in the lens array LA. The spectral image of the object is developed around the intersection of the optical axis of each small-diameter lens and the image sensor SS3.

The control system B3 includes a memory B31, an acquirer B32, an imaging controller B33, an A/D converter B34, and an image output unit B35. The control system B3 has the same function as that of either the control system B1 of the first embodiment or the control system B2 of the second embodiment.

The spectral range has a rectangular shape that is long in the X-axis direction in the first and second embodiments, but it has a square shape that has the same size in the X-axis direction and the Y-axis direction in this embodiment (the aspect ratio differs depending on the arrangement of the lens array LA). Setting the exposure conditions for each section can implement the aspect of the embodiments even when the mosaic type sensor is applied to the image sensor SS3 or even in a relatively small circuit scale. When a general rolling shutter type CMOS sensor is applied to the image sensor SS3, the disclosure can be implemented as simply as the first and second embodiments, for example, by setting a plurality of lines to the same exposure condition. For example, in FIG. 4B, the arrangement of the filter array FA is determined so as to form a spectral image having a wavelength close to a set of spectral ranges arranged in the X-axis direction (such as a set of A11, A12, and A13). In FIG. 4B, the spectral ranges A21, A22, and A23 corresponding to the wavelength of about 500 nm, to which the image sensor has the highest sensitivity, are arranged along the row direction. In the upper and lower rows, spectral ranges corresponding to wavelengths to which the image sensor has the similar sensitivities are collectively arranged. Although an exposure controllable wavelength interval is rougher than that of the pushbroom type image pickup system, the luminance saturation can be suppressed because the exposure of the spectral range can be weakened to which the image sensor has the highest sensitivity. The spectral optical system according to this embodiment can use a general CMOS sensor, and thus the disclosure can be economically implemented.

Each of the above embodiments provides an image pickup apparatus (C1, C2, C3) that includes a first image sensor unit (SS1, SS3) that includes a plurality of image sensors arranged in the first direction (x-axis direction in FIGS. 1B, 3B, and 4B), a second image sensor unit (SS1, SS3) that includes a plurality of image sensors arranged in the first direction, and a processor or circuit that serves as a control unit (imaging controllers B13, B23, B33) configured to control the first and second image sensor units). The first image sensor unit includes a first image sensor configured to receive a first image formed by light with a first wavelength. The second image sensor unit includes a second image sensor configured to receive a second image formed by light with a second wavelength different from the first wavelength. The control unit controls the plurality of image sensors in the first image sensor unit under a first common exposure condition, and controls the plurality of image sensors in the second sensor unit under a second common exposure condition different from the first common exposure condition.

As described above, the configuration according to this embodiment can restrain the intensity of incident light from lowering and balance acquired signals for each wavelength.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-132120, filed on Aug. 4, 2020, which is hereby incorporated by reference herein in its entirety.

What is claimed is:

1. An apparatus comprising:
a first sensor unit that includes a plurality of first sensors arranged in a first direction;
a second sensor unit that includes a plurality of second sensors arranged in the first direction;
an optical system configured to generate first light with a first wavelength and second light with a second wavelength by dispersing incident light, to form a first image using the first light, and to form a second image using the second light; and
a controller configured to control the first and second image sensor units,
wherein the plurality of first sensors are configured to receive the first light,
wherein the plurality of second sensors are configured to receive the second light,
wherein the first sensor unit and the second sensor unit are included in a single imager, and
wherein the controller controls the plurality of first sensors under a first common exposure condition, and controls the plurality of second sensors under a second common exposure condition.

2. The apparatus according to claim 1, wherein the first and second common exposure conditions include an exposure time.

3. The apparatus according to claim 1, wherein the first and second common exposure conditions include an ISO speed.

4. The apparatus according to claim 1, further comprising an acquirer configured to acquire the first and second common exposure conditions using wavelength sensitivity characteristics of the first and second sensors.

5. The apparatus according to claim 4, further comprising a memory configured to store the wavelength sensitivity characteristics of the first and second sensors.

6. The apparatus according to claim 1, further comprising an acquirer configured to acquire the first and second common exposure conditions using signals acquired from the first and second sensors.

7. The apparatus according to claim 1, further comprising an estimator configured to estimate a spectral characteristic of ambient light during imaging using an intensity ratio between the first image and the second image.

8. The apparatus according to claim 1, wherein the controller starts exposing the plurality of second sensors at a timing when the plurality of first sensors are exposed for a specific time.

9. The apparatus according to claim 1, wherein the controller makes the plurality of first sensors output a signal relating to the first image at a timing when the plurality of first sensors are exposed for a specific time, and restarts exposing the plurality of first sensors.

10. The apparatus according to claim 1, wherein the optical system includes a diffraction element, and
wherein the diffraction element has a spectral direction that is not parallel to the first direction.

11. The apparatus according to claim 1, wherein the optical system includes:
a first element configured to form the first image;

a second element configured to form the second image;

a first spectral filter disposed on an optical path of the first; and a second spectral filter disposed on an optical path of the second element.

12. The apparatus according to claim 1, wherein the optical system is attachable and detachable to the apparatus.

13. The apparatus according to claim 12, wherein the first and second common exposure conditions include an exposure time.

14. The apparatus according to claim 12, wherein the first and second common exposure conditions include an ISO speed.

15. The apparatus according to claim 12, further comprising an acquirer configured to acquire the first and second common exposure conditions using wavelength sensitivity characteristics of the first and second sensors.

16. The apparatus according to claim 12, further comprising an acquirer configured to acquire the first and second common exposure conditions using signals acquired from the first and second sensors.

17. The apparatus according to claim 12, further comprising an estimator configured to estimate a spectral characteristic of ambient light during imaging using an intensity ratio between the first image and the second image.

18. The apparatus according to claim 12, wherein the controller starts exposing the plurality of second sensors at a timing when the plurality of first sensors are exposed for a specific time.

19. The apparatus according to claim 12, wherein the controller makes the plurality of first sensors output a signal relating to the first image at a timing when the plurality of first sensors are exposed for a specific time, and restarts exposing the plurality of first sensors.

* * * * *